000
United States Patent Office 3,772,344
Patented Nov. 13, 1973

3,772,344
METHANESULFONIC ACID ESTERS OF 4-TRIFLUOROMETHYLPHENOLS
Horst Tarnow, Leverkusen, Klaus Sasse, Schildgen, and Bernard Homeyer, Opladen, Germany (all % Farbenfabriken Bayer Aktiengesellschaft, Leverkusen, Germany)
No Drawing. Filed Oct. 20, 1971, Ser. No. 191,073
Claims priority, application Germany, Oct. 23, 1970, P 20 52 027.8
Int. Cl. C07c *143/69*
U.S. Cl. 260—456 P   6 Claims

ABSTRACT OF THE DISCLOSURE

Methanesulfonic acid esters of 4-trifluoromethylphenols of the general formula

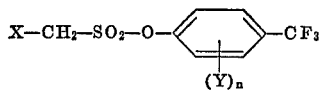

in which
X is hydrogen, chlorine or bromine,
Y is chlorine or bromine, and
n is an integer from 0 to 4,
which possess nematocidal, insecticidal, acaricidal, and fungicidal properties.

---

The present invention relates to and has for its objects the provision of particular new methanesulfonic acid esters of 4-trifluoromethylphenols, i.e. methanesulfonic acid or chloro- or bromo-methanesulfonic acid esters of 4-trifluoromethylphenol which may carry up to four chlorine or bromine ring substitutents, which possess nematocidal, insecticidal, acaricidal and fungicidal properties, active compositions in the form of mixtures of such compounds with solid and liquid dispersible carrier vehicles, and methods for producing such compounds and for using such compounds in a new way especially for combating pests, e.g. nematodes, insects, acarids and fungi, especially nematodes, with other and further objects becoming apparent from a study of the within specification and accompanying examples.

It is known from German patent specification 869,136 and Belgian patent specifications 625,454 and 647,424 that methane- and chloromethanesulfonic acid esters in general are suitable for the control of animal pests. The activity of the previously known compounds against nematodes and specifically against root-knot nematodes is, however, not satisfactory with small applied amounts.

The present invention provides methanesulfonic acid aryl esters of the formula

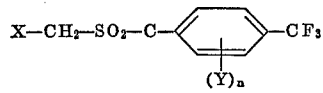

in which
X is hydrogen, chlorine or bromine,
Y is chlorine or bromine, and
n is an integer from 0 to 4.

These compounds exhibit strong nematocidal properties.

In Formula I, n is preferably 0 to 2.

The invention also provides a process for the production of a methanesulfonic acid aryl esters of the Formula I in which a methanesulfonic acid halide of the formula:

$$X-CH_2-SO_2-Hal \qquad (II)$$

in which
Hal is chlorine or bromine, and
X has the meaning stated above,
is reacted with a trifluoromethyl-phenol of the formula:

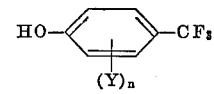

in which
Y and n have the meanings stated above,
in the presence of an acid binder.

Surprisingly, the methanesulfonic acid aryl esters according to the invention show a considerably higher nematocidal activity than the methane and chloromethanesulfonic acid esters known from the prior art which are the chemically closest active compounds of the same type of activity. The substances according to the invention therefore represent an enrichment of the art.

If methanesulfonic acid chloride and 4-trifluoromethylphenol are used as starting materials, the reaction course can be represented by the following formula scheme:

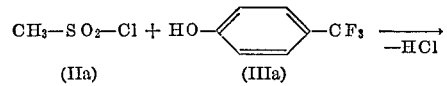
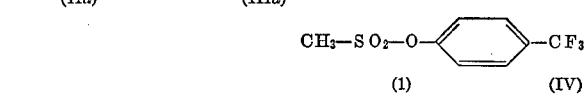

The mathanesulfonic acid halides to be used as starting materials, defined by the Formula II, are generally known.

The trifluoromethylphenols to be used as starting materials are defined by the Formula III. The trifluoromethylphenols are largely known (cf. R. G. Jones, J. Am. Chem. Soc., 69, 2346–2350 (1947), E. J. Lawson and C. M. Suter, U.S. patent specification 2,489,423 (1949), E. T. McBee and E. Rapkin, J. Am. Chem. Soc., 73, 1325–1326 (1951), A. Mooradian, T. J. Slauson and S. J. Marsala, J. Am. Chem. Soc., 73, 3470–3472 (1951)). A few of the compounds are still new but they can be prepared in manner known in principle by treating the appropriate trichloromethylphenylcarbonates with anhydrous hydrofluoric acid and subsequently hydrolyzing the carbonates (cf. German published specification 1,257,784).

The reaction may be carried out in a solvent, which term includes a mere diluent. For this purpose, all inert organic solvents are suitable. These include preferably hydrocarbons, such as benzine, benzene and xylene; chlorinated hydrocarbons, such as methylene chloride and chlorobenzene; and ethers, such as diethyl ether and dioxane. The reaction can also be carried out in water.

As acid binders, all customary acid-binding agents can be used. These include preferably alkali metal and alkaline earth metal hydroxides and alkali metal carbonates, metal alcoholates, such as sodium methylate, and tertiary amines, such as triethylamine or pyridine; the latter may simultaneously be used as diluent.

The reaction temperatures can be varied within a fairly wide range. In general, the reaction is carried out at about 0 to 100° C., preferably about 10 to 70° C.

The reaction normally proceeds with sufficient speed under normal pressure, but it is also possible to work in closed vessels at increased pressure.

When carrying out the process, there are preferably used 1 to 1.2 moles of sulfonic acid halide to 1 mole of phenol. Amounts lesser or greater by about up to 20 percent do not substantially impair the yield. The acid binder can likewise be used in equimolar amount; preferably, however, an excess of about up to 50% is used. The reaction mixtures are worked up in customary manner, e.g. by dilution with water and extraction of the crude product with chloroform. The crude products are purified by distillation and/or recrystallization.

As already mentioned, the products according to the invention are distinguished by an outstanding, rapidly occurring nematocidal effectiveness and possess, in addition, a good insecticidal, acaricidal and soil-fungicidal side-effect, combined with only low toxicity to warm-blooded animals and low phytotoxicity.

By reason of these properties, the new substances are useful in crop protection for the control of nematodes; especially those of phytopathogenic nature. In view of the simultaneous insecticidal, acaricidal and soil-fungicidal activity of the compounds, any sucking and eating insects, Diptera and mites as well as soil-inhabiting phytopathogenic fungi which may be present also tend to be destroyed at the same time. As a result of this broad activity spectrum of the compounds, the need for a separate control of the various, often jointly occurring types of pests can be overcome, which represents a further advance in the art.

To the phytopathogenic nematodes contemplated herein there belong, in the main, bud and leaf nematodes (Aphelenchoides), such as the chrysanthemum foliar nematode (*A. ritzemabosi*), spring crimp nematode (*A. fragariae*) and rice white-tip nematode (*A. oryzae*); stem nematodes (Ditylenchus), e.g. the stem and bulb nematode (*D. dipsaci*); root-knot nematodes (Meloidogyne), such as *M. arenaria* and *M. incognita;* cyst nematodes (Heterodera), such as the golden nematode of potato (*H. rostochiensis*) and the sugar beet nematode (*H. schachtii*); as well as free-living root nematodes, e.g. of the genera Pratylenchus, Paratylenchus, Rotylenchus, Xiphinema and Radopholus; and the like.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), paraffins (e.g. petroleum or mineral oil fractions), chlorinated aliphatic hydrocarbons (e.g. methylene chloride, chloroethylenes, etc.), cycloaliphatic hydrocarbons (e.g. cyclohexane), alcohols (e.g. methanol, ethanol, propanol, butanol, glycol, etc.) as well as their ethers and esters, amine (e.g. ethanolamine, etc.), ether-alcohols (e.g. glycol monomethyl ether, etc.), ketones (e.g. acetone, methyl ethyl ketone, methyl isobutyl ketone, cyclohexanone, etc.), strongly polar solvents such as nitriles (e.g. acetonitrile, etc.), amides (e.g. dimethyl formamide, etc.) and sulfoxides (e.g. dimethyl sulfoxide, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglyco ethers, magnesium stearate, sodium oleate, etc.); and/or dispersing agents, such as lignin, sulfite waste liquor, methyl cellulose, etc.

Such active compounds may be employed alone or in the form of mixtures with one another and/or with such solid and/or liquid dispersible carrier vehicles and/or with other known compatible active agents, especially plant protection agents, such as other nematocides, insecticides, acaricides and fungicides, or bactericides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. nematodes, insects, acarids and fungi, and more particularly methods of combating nematodes, which comprises applying to at least one of correspondingly (a) such nematodes, (b) such insects, (c) such acarids, (d) such fungi, and (e) the corresponding habitat thereof, i.e. the locus to be protected, a correspondingly combative or toxic amount, i.e. a nematocidally, insecticidally, acaricidally or fungicidally effective amount of the particular active compound of the invention alone or together with a carrier vehicle as noted above. The instant formulations or compositions are applied in the usual manner, for for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples.

EXAMPLE 1

Nematocidal activity/Critical concentration test

Test nematode: *Meloidogyne incognita*
Solvent: 3 parts by weight acetone
Emulsifier: 1 part by weight alkylarylpolyglycol ether.

To produce a suitable preparation of active compound, 1 part by weight of active compound is mixed with the stated amount of solvent, the stated amount of emulsifier is added and the concentrate is diluted with water to the desired concentration.

The preparation of active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature of 27° C. After 4 weeks, the lettuce roots are examined for infestation with nematodes, and the degree of effectiveness of the active compound is determined as a percentage. The degree of effectiveness is 100% when infestation is completely avoided; it is 0% when the infestation is exactly the same as in the case of the control plants in untreated soil which has been infested in the same manner.

The active compounds, the amounts applied and the results can be seen from the following table:

anesulfochloride. Stirring is afterwards effected for 1 hour at 20° C. and for 3 to 4 hours at 50° C., followed by dilution with ice water and extraction of the separating oil with chloroform. After removal of the solvents, the residue is distilled at the B.P. 105–106° C./0.08 mm. Hg. There are obtained 210 g. of methanesulfonic acid 4-trifluoromethyl-phenyl ester, 87.5% of the theory, with a refractive index of $n_D^{20}=1.4635$.

EXAMPLE 3

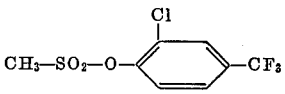
(2)

By the procedure of Example 2, from 2-chloro-4-trifluoromethylphenol there is obtained methanesulfonic acid 2-chloro-4-trifluoromethyl-phenyl ester in a yield of 82% of theory with the boiling range B.P. 89–91° C./0.1 mm. Hg and the refractive index $n_D^{20}=1.4820$.

EXAMPLE 4

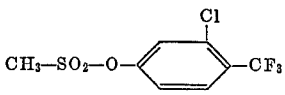
(3)

By the procedure of Example 2 from 3-chloro-4-trifluoromethylphenol there is obtained methanesulfonic acid 3-chloro-4-trifluoromethyl-phenyl ester of the melting point 39–41° C. (from dry cleaning naphtha) in a yield of 81% of theory.

EXAMPLE 5

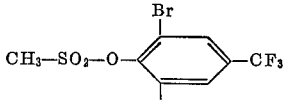
(4)

By the procedure of Example 2, from 2,6-dibromo-4-trifluoromethyl-phenol there is obtained methanesulfonic acid 2,6-dibromo-4-trifluoromethyl-phenyl ester of the melting point 129–131° C. (from dry cleaning naphtha) in a yield of 90% of theory.

TABLE.—NEMATOCIDAL ACTIVITY/CRITICAL CONCENTRATION TEST

| Active compound | Degree of destruction in percent with a concentration of active compound at— | | | | |
|---|---|---|---|---|---|
| | 20 p.p.m. | 10 p.p.m. | 5 p.p.m. | 2.5 p.p.m. | 1.25 p.p.m. |
| (A) 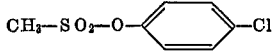 (known) | 0 | | | | |
| (B) 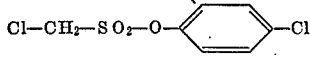 (known) | 90 | 50 | 0 | | |
| (1) 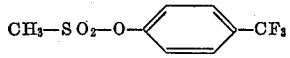 | 100 | 95 | 75 | 20 | 0 |
| (2) 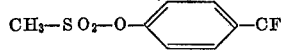 | 100 | 98 | 90 | 80 | 50 |
| (5) 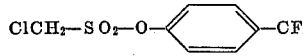 | 100 | 95 | 90 | 50 | |

The preparation of the novel compounds is illustrated in the following examples.

EXAMPLE 2

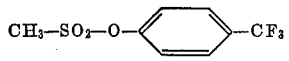
(1)

162 g. (1 mole) of 4-trifluoromethyl-phenol are dissolved in 300 ml. of dioxane. Thereafter, there are added dropwise, with ice cooling, first 100 ml. (=98 g., i.e. 1.25 moles) of pyridine and then 126 g. (1.1 moles) of meth-

EXAMPLE 6

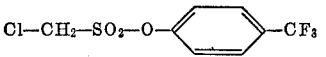
(5)

By the procedure of Example 2, from 4-trifluoromethyl-phenol and chloromethanesulfochloride there is obtained chloromethane sulfonic acid 4-trifluoromethyl-phenyl ester in a yield of 69% of theory with the boiling range B.P. 99–100° C./0.08 mm. Hg and the refractive index $n_D^{20}=1.4780$.

The corresponding bromomethanesulfonic acid ester can be prepared from the corresponding bromomethanesulfochloride.

It will be appreciated that the instant specification and examples are set forth by way of illustration and not limitation, and that various modifications and changes may be made without departing from the spirit and scope of the present invention.

What is claimed is:

1. Methanesulfonic acid phenyl esters of the formula:

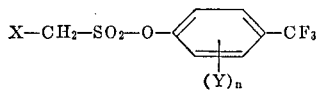

in which
X is hydrogen, chlorine or bromine,
Y is chlorine or bromine, and
$n$ is an integer from 0 to 2.

2. A compound according to claim 1 wherein such compound is methanesulfonic acid 4-trifluoromethyl-phenyl ester of the formula

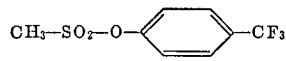

3. A compound according to claim 1 wherein such compound is methanesulfonic acid 2-chloro-4-trifluoromethyl-phenyl ester of the formula

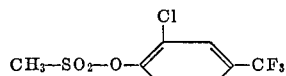

4. A compound according to claim 1 wherein such compound is methanesulfonic acid 3-chloro-4-trifluoromethyl-phenyl ester of the formula

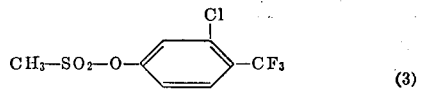

5. A compound according to claim 1 wherein such compound is methanesulfonic acid 2,6-dibromo-4-trifluoromethyl-phenyl ester of the formula

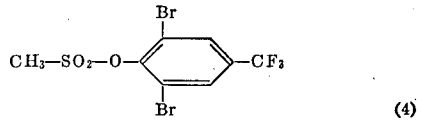

6. A compound according to claim 1 wherein such compound is chloromethanesulfonic acid 4-trifluoromethyl-phenyl ester of the formula

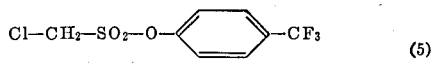

References Cited
UNITED STATES PATENTS

| | | | |
|---|---|---|---|
| 3,401,222 | 9/1968 | Haynes | 260—456 P X |
| 3,228,827 | 1/1966 | Larson et al. | 260—456 P X |
| 3,395,232 | 7/1968 | White | 260—456 P X |

BERNARD HELFIN, Primary Examiner

J. E. EVANS, Assistant Examiner

U.S. Cl. X.R.
424—303